(12) United States Patent
Dahl et al.

(10) Patent No.: US 9,133,817 B2
(45) Date of Patent: Sep. 15, 2015

(54) METHOD OF MANUFACTURING A COMPOSITE STRUCTURE WITH PREFABRICATED REINFORCEMENT ELEMENT

(75) Inventors: Martin Dahl, Flensburg (DE); Ejnar Friis Hansen, Randbøl (DK); Bjarne Krab Mortensen, Billund (DK); Peter Grabau, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 459 days.

(21) Appl. No.: 13/321,827

(22) PCT Filed: May 25, 2010

(86) PCT No.: PCT/EP2010/057122
§ 371 (c)(1),
(2), (4) Date: Nov. 22, 2011

(87) PCT Pub. No.: WO2010/136432
PCT Pub. Date: Dec. 2, 2010

(65) Prior Publication Data
US 2012/0067515 A1    Mar. 22, 2012

(30) Foreign Application Priority Data
May 25, 2010    (EP) .................................. 09160988

(51) Int. Cl.
*B29C 70/34*    (2006.01)
*F03D 1/06*    (2006.01)
(Continued)

(52) U.S. Cl.
CPC .............. *F03D 1/065* (2013.01); *B29C 70/467* (2013.01);
(Continued)

(58) Field of Classification Search
CPC .... B29C 70/467; B29C 70/48; B29C 70/542; B29C 70/543; B29C 70/865
USPC .......................................................... 156/245
See application file for complete search history.

(56) References Cited

U.S. PATENT DOCUMENTS

| 5,041,182 | A | 8/1991 | Sekiguchi et al. | |
| 6,264,877 | B1 | 7/2001 | Pallu De La Barriere | |
| 7,922,454 | B1 * | 4/2011 | Riddell | 416/224 |
| 8,282,874 | B2 * | 10/2012 | Stiesdal | 264/511 |

(Continued)

FOREIGN PATENT DOCUMENTS

| EP | 1 310 351 A1 | 5/2003 |
| EP | 1 695 813 A1 | 8/2006 |

(Continued)

*Primary Examiner* — Philip Tucker
*Assistant Examiner* — Vicki Wu
(74) *Attorney, Agent, or Firm* — Nath, Goldberg & Meyer; Jerald L. Meyer; Tanya E. Harkins

(57) ABSTRACT

A method of manufacturing a longitudinally extending composite structure including a shell part comprising a fiber reinforced polymer material including a polymer matrix and fiber material embedded in the polymer material is described. The shell part is manufactured in a closed mold comprising at least a first outer mold part having a first forming surface and a second outer mold part having a second forming surface. The method comprises the steps of: arranging a first fiber material in the first forming surface of the first outer mold part, arranging a pre-fabricated longitudinally extending reinforcement element, such as a beam or a web, on top of the first fiber material, arranging a second fiber material in the second forming surface of the second outer mold part, and sealing a polymer foil above the second fiber material so as to retain the second fiber material against the second forming surface.

14 Claims, 9 Drawing Sheets

Figure 1:
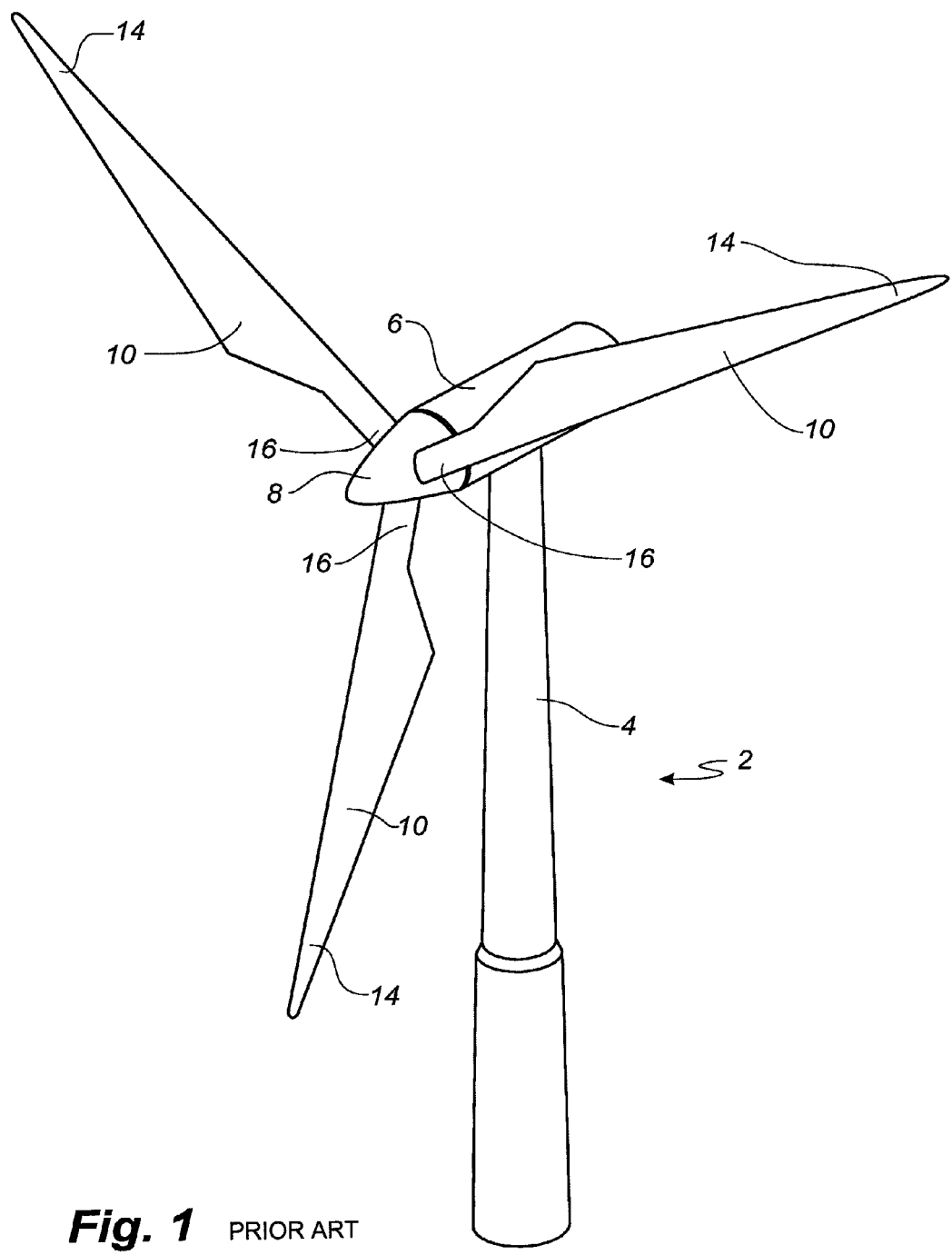

(51) Int. Cl.
- *B29C 70/46* (2006.01)
- *B29C 70/48* (2006.01)
- *B29C 70/54* (2006.01)
- *B29C 70/86* (2006.01)
- *B29D 99/00* (2010.01)
- *B29K 105/24* (2006.01)
- *B29L 31/08* (2006.01)

(52) U.S. Cl.
CPC ............... *B29C 70/48* (2013.01); *B29C 70/542* (2013.01); *B29C 70/543* (2013.01); *B29C 70/865* (2013.01); *B29D 99/0028* (2013.01); *B29K 2105/246* (2013.01); *B29L 2031/082* (2013.01); *B29L 2031/085* (2013.01); *Y02E 10/721* (2013.01)

(56) References Cited

U.S. PATENT DOCUMENTS

| | | |
|---|---|---|
| 2003/0116262 A1 | 6/2003 | Stiesdal et al. |
| 2007/0036659 A1* | 2/2007 | Hibbard ........................ 416/233 |
| 2010/0062238 A1* | 3/2010 | Doyle et al. ................ 428/295.1 |
| 2010/0135816 A1* | 6/2010 | Cairo ........................... 416/226 |
| 2010/0239426 A1* | 9/2010 | Westergaard ................. 416/226 |
| 2010/0278654 A1* | 11/2010 | Kyriakides ................... 416/226 |
| 2012/0257984 A1* | 10/2012 | Frederiksen ................. 416/232 |

FOREIGN PATENT DOCUMENTS

| | | |
|---|---|---|
| EP | 1 880 833 A1 | 1/2008 |
| EP | 1880833 A1 * | 1/2008 |
| JP | 2007255366 A * | 10/2007 |
| WO | WO 8905717 A1 * | 6/1989 |
| WO | 2008/086805 A2 | 7/2008 |

* cited by examiner

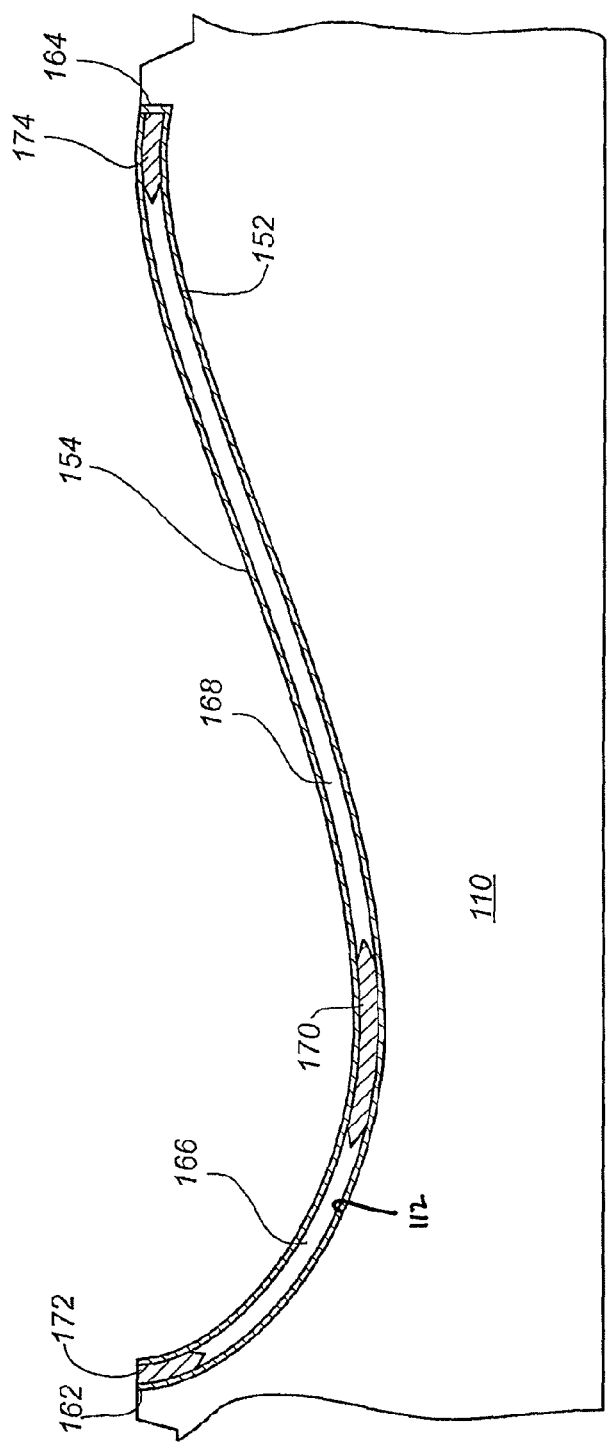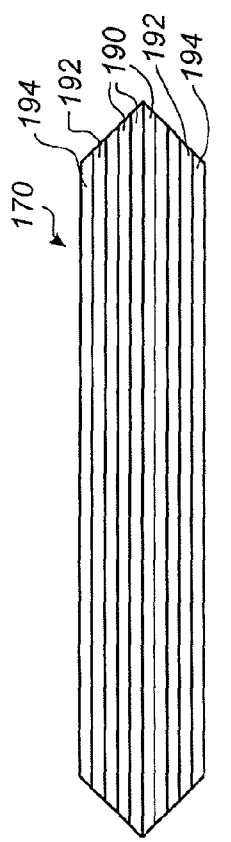
Fig. 3
Fig. 4

METHOD OF MANUFACTURING A COMPOSITE STRUCTURE WITH PREFABRICATED REINFORCEMENT ELEMENT

This is a National Phase Application filed under 35 U.S.C. §371 as a national stage of PCT/EP2010/057122, filed on May 25, 2010, an application claiming the benefit under 35 U.S.C. §119 of European Application No. 09160988.3, filed on May 25, 2009, the content of each of which is hereby incorporated by reference in its entirety.

The present invention relates to a method of manufacturing a longitudinally extending composite structure including a shell part comprising a fibre reinforced polymer material including a polymer matrix and fibre material embedded in the polymer material, wherein the shell part is manufactured in a closed mould comprising at least a first outer mould part having a first forming surface and a second outer mould part having a second forming surface.

Vacuum infusion or VARTM (vacuum assisted resin transfer moulding) is one method, which is typically employed for manufacturing composite structures, such as wind turbine blades comprising a fibre reinforced matrix material. During the manufacturing process, liquid polymer, also called resin, is filled into a mould cavity, in which fibre material priorly has been inserted, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the first mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity.

Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to avoid by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

Prepreg moulding is a method in which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RTM and a VARTM process.

As for instance blades for wind turbines have become bigger and bigger in the course of time and may now be more than 60 meters long, the impregnation time in connection with manufacturing such blades has increased, as more fibre material has to be impregnated with polymer. Furthermore, the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time. Additionally, the wind turbine industry has grown with nearly exponential rate over the past few decades, thereby increasing the demands for throughput of manufactured wind turbine blades. This increased demand cannot be satisfied by building new factories alone, but also requires that the manufacturing methods are optimised.

Typically, a wind turbine blade is manufactured by use of two separately manufactured shell parts, e.g. the pressure side and suction side of the wind turbine blade, which is subsequently glued together, for instance via use of glue flanges. However, this process entails the need for post processing of the exterior surface of the blade. It may for instance be necessary to treat the wind turbine blades around the bond lines between the two shell parts, e.g. by grinding, polishing and cleaning the blade near the leading edge and/or the trailing edge of the wind turbine blade. It may even be necessary to provide additional fibre material and resin to the wind turbine blade.

One method of optimising the manufacturing method is thus to reduce the necessary post processing of the wind turbine blade. This may for instance be achieved by manufacturing the shell part in one piece via a closed, hollow mould. Such manufacturing systems are described in for instance EP 1 310 351, and EP 1 880 833.

However, the prior art is not concerned with how to ensure that a longitudinally extending reinforcement element, such as a beam or a web, is correctly aligned within the shell part of the wind turbine blade and securely bonded to said shell part.

It is an object of the invention to obtain a new blade and a new method of manufacturing such a composite structure, such as a wind turbine blade, and which overcomes or ameliorates at least one of the disadvantages of the prior art or which provides a useful alternative.

According to a first aspect, this is obtained by the method comprising the steps of: a) arranging a first fibre material in the first forming surface of the first outer mould part, b) arranging a pre-fabricated longitudinally extending reinforcement element, such as a beam or a web, on top of the first fibre material, the reinforcement element having a first side and a second side, and a first bonding surface and a second bonding surface, the reinforcement element being arranged so that the first bonding surface faces towards the first forming surface, c) arranging a second fibre material in the second forming surface of the second outer mould part, d) sealing a polymer foil above the second fibre material so as to retain the second fibre material against the second forming surface, e) closing the at least first outer mould part and the second outer mould part so as to form the closed mould, and so that the second bonding surface of the reinforcement element faces towards the second forming surface, f) forming a mould cavity by arranging a first vacuum bag between the first outer mould part, the second outer mould part and the first side of the reinforcement element, and arranging a second vacuum bag between the first outer mould part, the second outer mould part and the second side of the reinforcement element, and g) evacuating the mould cavity, h) providing a resin in the mould cavity simultaneously with and/or subsequently to steps a) and c), and i) curing the resin in order to form the composite structure.

Thus, a particular simple method of manufacturing a composite structure, such as a wind turbine blade, in "one shot" is provided. The reinforcement element is used to retain the fibre material against the mould part during layup. Furthermore, the first bonding surface of the reinforcement element bonds to the first fibre material, and the second bonding surface of the reinforcement element bonds to the second fibre material. By using a pre-fabricated reinforcement element, it is ensured that the reinforcement element can be arranged with high precision without the risk of the reinforcement element buckling or the like, thus ensuring a mechanical strength of the wind turbine blade.

Typically, the mould cavity is kept at a first temperature allowing the resin to flow as a liquid and subsequent heating the mould cavity to a higher second temperature allowing the resin to cure, i.e. during step i). If prepregs are used, the resin is heated to the first temperature allowing the resin to liquidise and reflow and thus impregnating the entire composite structure, and later heated further to cure the resin. The evacuation is advantageously carried via vacuum outlet(s) communicating with the mould cavity.

The first vacuum bag or second vacuum bag are sealed inside the shell part of the composite structure, preferably without the use of filling material. Accordingly, it is not necessary to use a mould core, as the reinforcement element and the polymer foil retain the fibre material against the forming surfaces.

Preferably, the composite structure is formed as an elongated structure having a length of at least 40 meters. Yet again, the length may be at least 50 meters or at least 60 meters. Preferably, the composite structure is a wind turbine blade.

According to an advantageous embodiment, the reinforcement element comprises a composite material, the composite material comprising a substantial part being pre-cured, i.e. a majority of the composite is pre-cured, preferably at least 51%, 60%, 70%, 80%, 90%, or 95% of the composite material. According to another advantageous embodiment, the entire composite material of the reinforcement element is pre-cured.

According to yet another advantageous embodiment, the composite material of the reinforcement element comprises an uncured part at the first bonding surface and/or the second bonding surface. The uncured part may for instance be pre-impregnated with resin. Thereby, a further bonding strength is ensured between the reinforcement element and the shell part of the wind turbine blade, since the resin can be brought to reflow and subsequently cured together with the resin supplied to the shell part of the blade.

The reinforcement element may be tapered and pre-bent in the longitudinal direction of the wind turbine blade, so that the bonding surfaces follows the contour of the wind turbine blade.

According to an advantageous embodiment, the reinforcement element comprises a first longitudinally extending reinforcement section at the first bonding surface and/or a second longitudinally extending reinforcement section at the second bonding surface. The reinforcement element may be so arranged during the manufacturing process that the reinforcement sections form longitudinally extending reinforcement sections being part of the shell part of the blade. Such reinforcement sections are typically provided as a plurality of fibre layers. Accordingly, it is not necessary to provide a reinforcement section via arranging a plurality of fibre layers during step a) and c), which simplifies the manufacturing method even further.

According to a first embodiment, the reinforcement element is formed as an I-shaped beam. According to a second embodiment, the reinforcement element is formed as a longitudinally extending tubular element. Thereby two particular simple and mechanically stable beam configurations are provided. If the reinforcement element is tubular shape, it may be necessary during step f) to provide a further vacuum bag within the tubular element in order to obtain a sufficient evacuation of the mould cavity.

According to a particularly advantageous embodiment, the first fibre material and/or the second fibre material comprises a prepreg material. According to one embodiment, the first fibre material and the second fibre material comprises prepreg material only, and where no further resin is supplied after steps a) and c). Thereby, a particularly simple closed moulding method is provided, wherein the mould parts need not be provided with resin inlets. However, according to another embodiment, additional resin is supplied to the mould cavity between step h) and step i).

The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET.

However, according to a particularly advantageous embodiment, the resin comprises an in-situ polymerisable thermoplastic material. The in-situ polymerisable thermoplastic material may advantageously be selected from the group consisting of pre-polymers of: polybutylene terephthalate (PBT), polyamide-6 (pre-polymer is caprolactam), polyamide-12 (pre-polymer is laurolactam) alloys of polyamide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), polyethylenenaphthalate (PEN) and polybutylenenaphthalate (PBN), cyclic poly(1,4-butylene terephthalate) (CBT) and/or combinations thereof.

The in-situ polymerisable thermoplastic material has the advantage that it may be handled in its pre-polymer state and can be handled in as a liquid, a powder or pellets. Accordingly, the material may be used for pre-impregnating the fibre material, i.e. in a pre-preg. Alternatively, it may be sprayed on in powder form on the fibre material or be arranged in the mould parts as separate layers.

In-situ polymerisable thermoplastic materials, such as CBT, has the advantage that they obtain a water-like viscosity when heated to a temperature of approximately 150 degrees Celsius. Thereby, it is possible to quickly impregnate the fibre material of very large composite structures to be moulded and subsequently curing the resin in very short cycle times.

CTB is available as one-part systems, where a catalyst is premixed into the resin, and where the catalyst is activated for instance by heating, and as two-part systems, where the catalyst and resin are kept separately until immediately before use.

In some situations it may be advantageous—as previously explained—to draw in additional in-situ polymerisable thermoplastic material in order to impregnate the entire fibre material. In such a situation it may be advantageous to use one-part systems for the pre-supplied resin and two-part systems for the additional resin.

The term polymerisable thermoplastic material means that the material may be polymerised once at the manufacturing site.

Compared to for instance EP 1 880 833, the present invention has the advantage that the longitudinally extending reinforcement element is pre-fabricated and may be arranged with high precision, which ensures bonding to the shell part of the wind turbine blade, and which further ensures that the main body of the reinforcement element does not buckle during use of the wind turbine blade. Thus, a high mechanical strength and stiffness of the finished wind turbine blade is ensured.

According to an advantageous embodiment, the polymer foil is made of a material which melts into the resin prior to curing of the composite structure. Thus, the polymer foil is allowed to be resolved and thus being part of the shell structure and provides even further bonding between the reinforcement element and the shell structure.

An additional polymer foil may be used on top of first fibre material in order to facilitate further bonding to the first bonding surface of the reinforcement element.

According to another advantageous embodiment, the first outer mould part and the second outer mould part are arranged during step e) so that the first fibre material and the second fibre material partially overlap at a boundary surface. Thus, it is ensured that the composite structure does not contain any bonding lines, which may later lead to hairline fractures or the like.

The first fibre material may comprise glass fibres, carbon fibres, plastic fibres or plant fibres. According to yet another advantageous embodiment, the first fibre material and/or the second fibre material comprises metal fibres, advantageously steel fibres.

In one embodiment, liquid resin is supplied during step h) from a lower part of the mould cavity. This is particular advantageous with the in-situ polymerisable thermoplastic material, which has a very low viscosity when allowed to flow. Thus, resin inlets arranged at a low point in the cross-section of the mould cavity. Thereby, the flow front of liquid resin moves upwards during the impregnation process. Since, air is lighter than the resin, gravity thus further reduces the possibility of formation of air pockets in the composite structure. This is even further advantageous when using metallic fibres, such as steel fibres, where the voids between the individual fibres are comparatively large.

Tacky tape may utilised to seal the polymer foil against the second mould part. Alternatively, a rubber sealant may be used.

According to one advantageous embodiment, the distance between the first bonding surface and the second bonding surface of the reinforcement element is larger than the distance between the first fibre material and the second fibre material. Thus, it is ensured that the bonding surfaces indeed are bonded to the shell part and allows for production tolerances.

It may be advantageous to use arrange additional reinforcement elements on top of the first fibre material during step c). This is particularly advantageous for very large wind turbine blade having a length of for instance 60 meters or more. In this situation, it may be necessary to utilise even further vacuum bags.

The invention is explained in detail below with reference to an embodiment shown in the drawings, in which FIG. 1 shows a wind turbine, FIG. 2 a schematic view of a wind turbine blade, FIG. 3 shows a schematic cross section of a first mould part with fibre material arranged in the mould part, FIG. 4 shows a cross section of a reinforcement section in a wind turbine blade.

Figure 5:
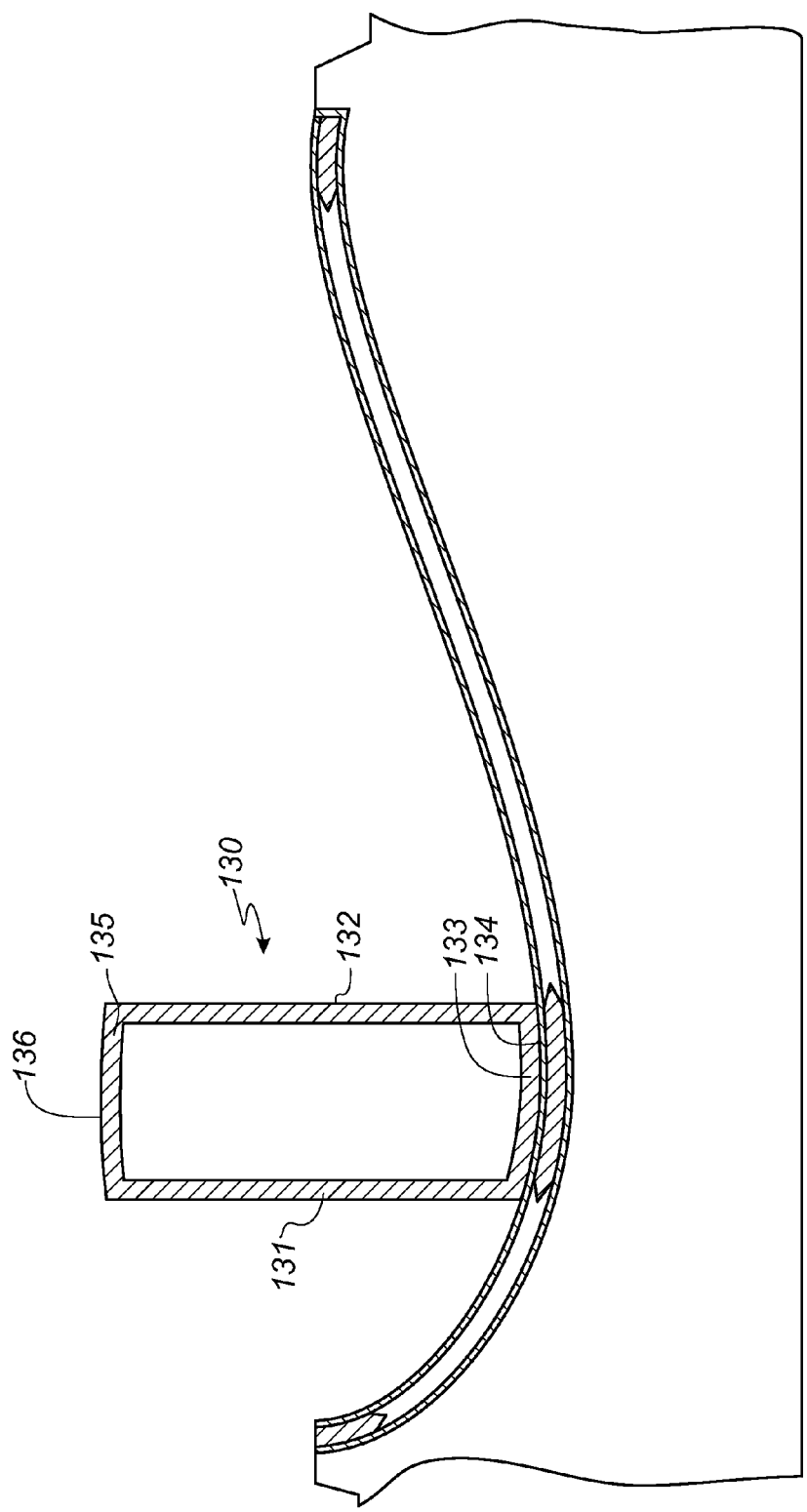
Figure 6:
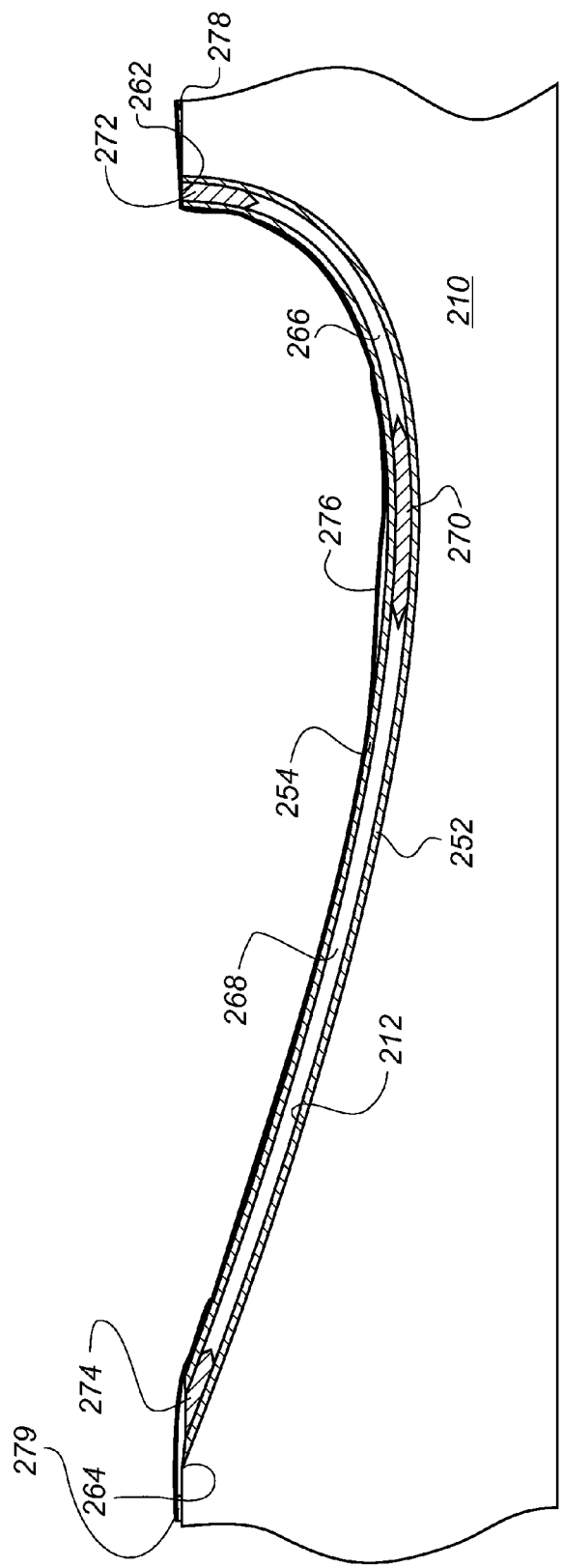
Figure 7:
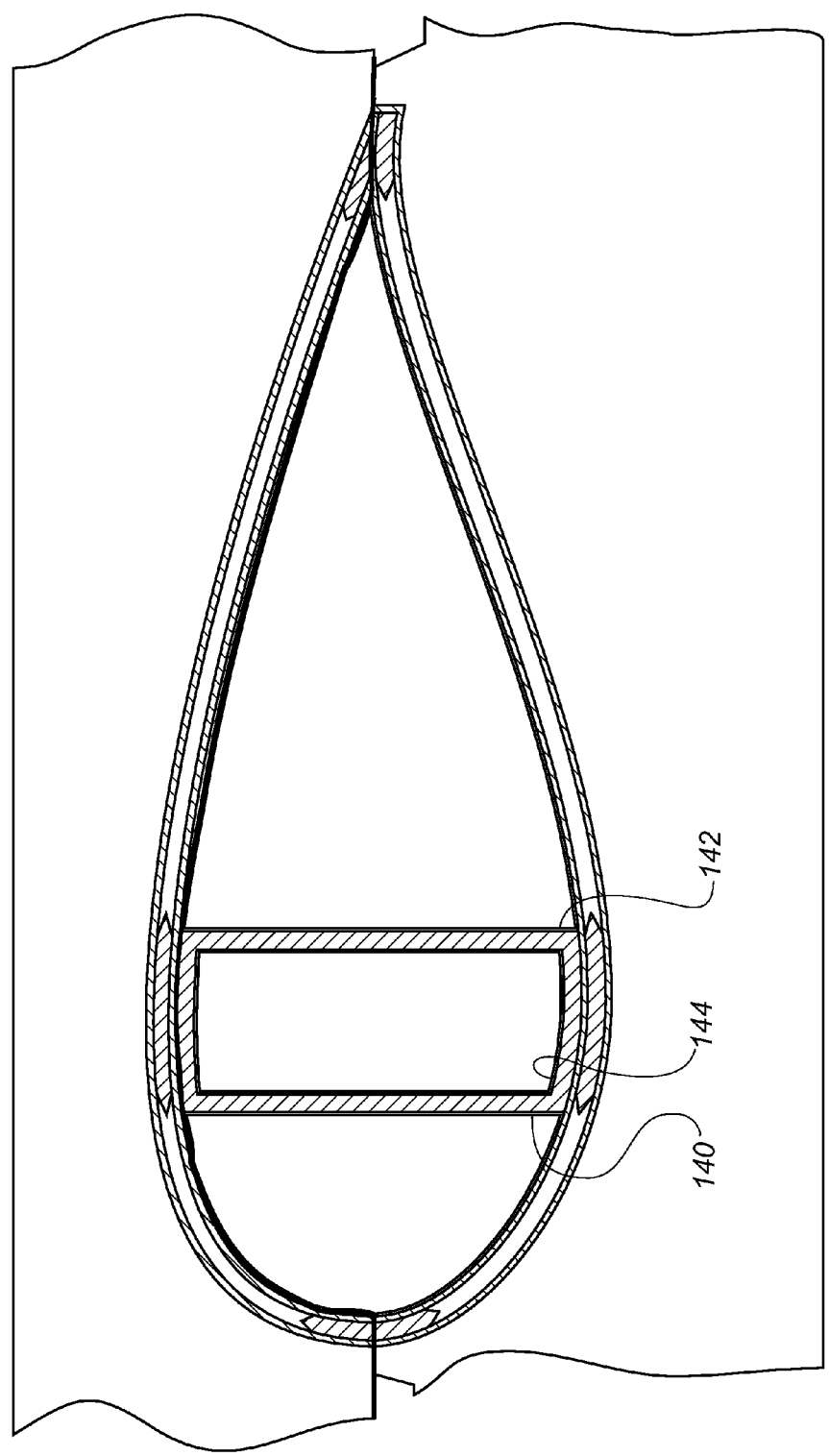
Figure 8:
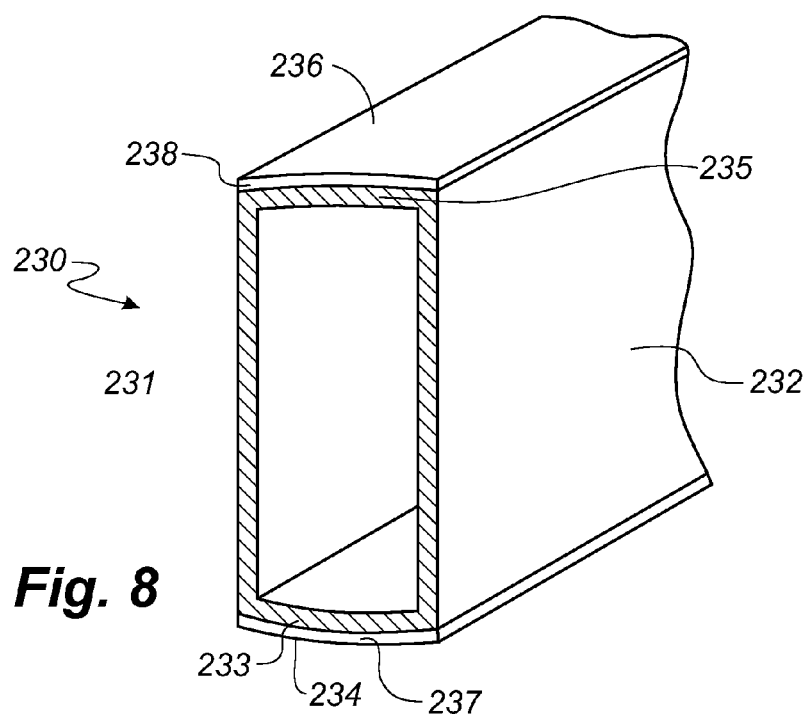
Figure 9:
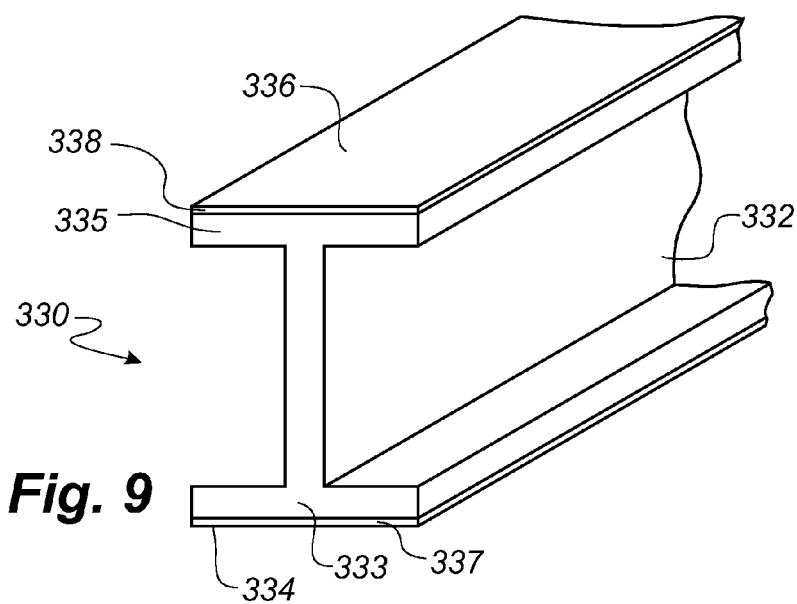
Figure 10:
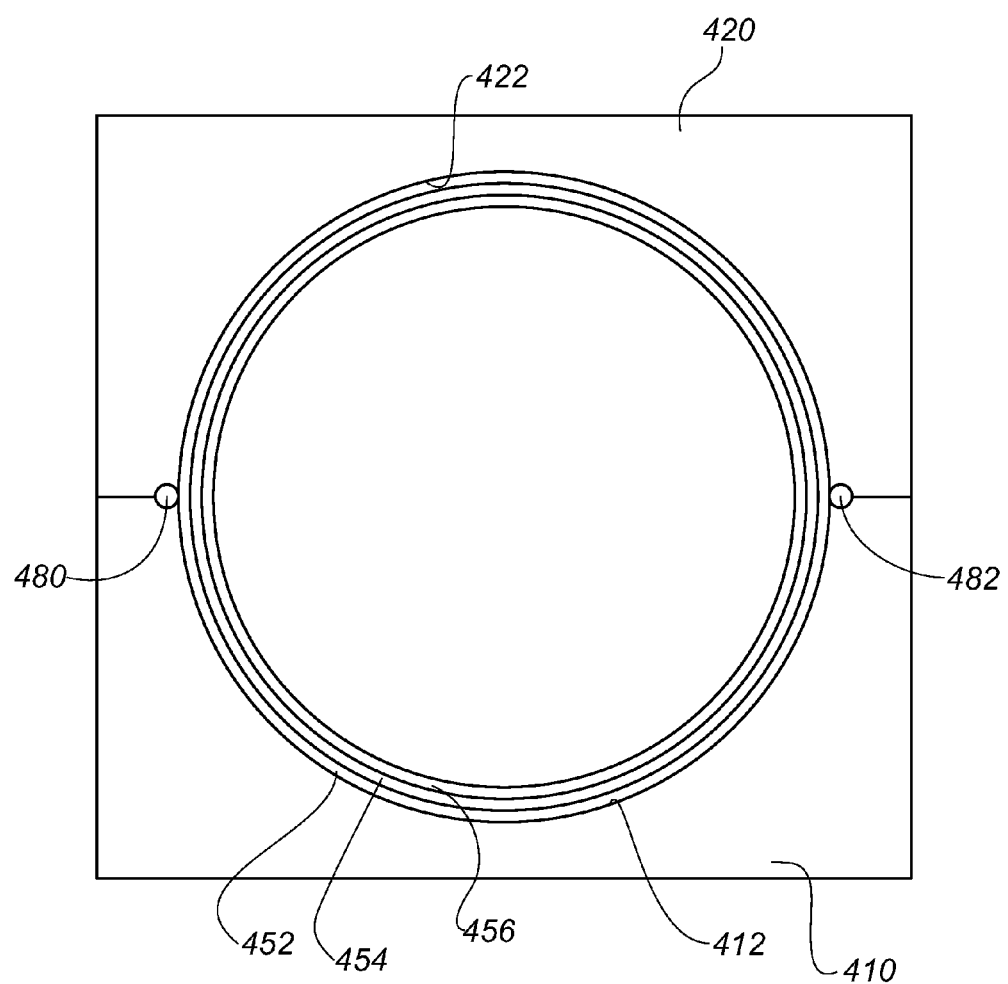
Figure 11:
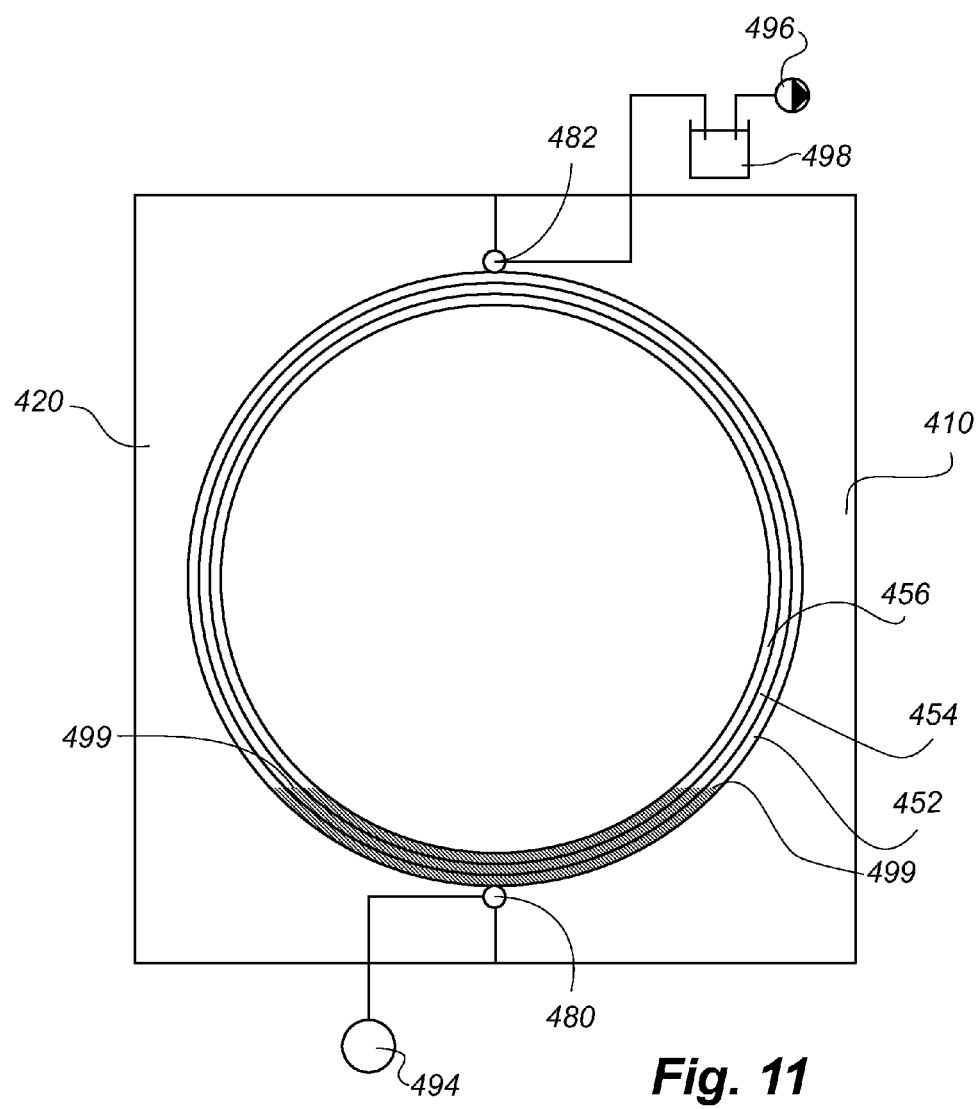

FIG. 5 shows a schematic cross section of the first mould part with fibre material and a reinforcement element arranged in the mould part, FIG. 6 shows a schematic cross section of a second mould part with fibre material arranged in the mould part, FIG. 7 shows a schematic cross section of the first and the second mould part in a closed mould configuration, FIG. 8 shows a schematic view of a second embodiment of a reinforcement element, FIG. 9 shows a schematic view of a third embodiment of a reinforcement element, FIG. 10 shows a schematic cross section a second embodiment of a first and a second mould part in a closed mould configuration, and FIG. 11 shows a schematic cross section of the second embodiment during an impregnation process.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
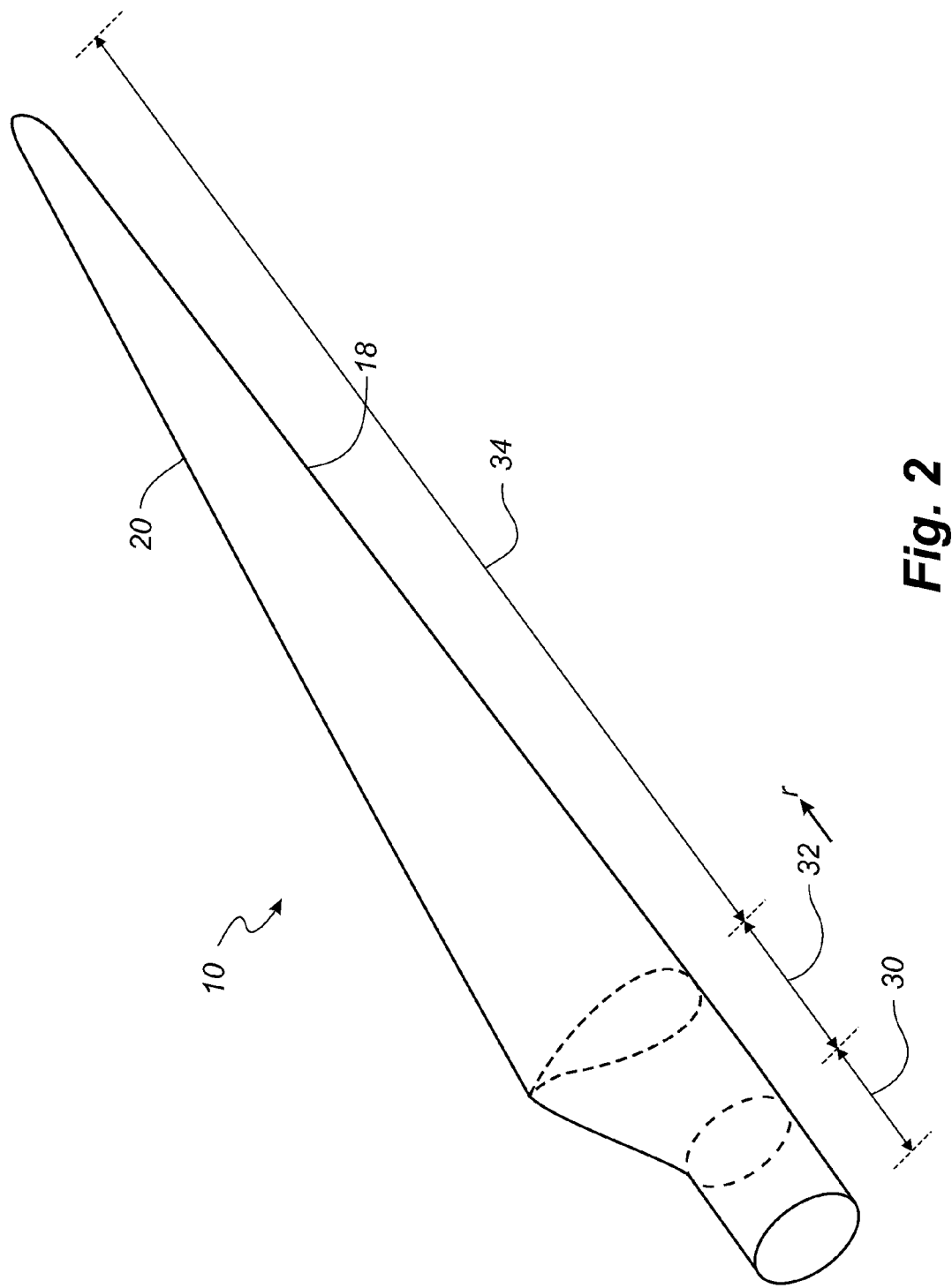

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape 40 of the root region 30 to the airfoil profile of the airfoil region 34. The width of the transition region 32 typically increases substantially linearly with increasing distance r from the hub.

The airfoil region 34 has an airfoil profile with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade is provided with a longitudinally extending reinforcement element in form of a web or a beam (not shown). This reinforcement element needs to follow the contour of the wind turbine blade in order to provide the necessary mechanical strength. Thus, it may be tapered to follow the thickness of the blade. Further, it may be pre-bent and/or twisted in the longitudinal direction.

The invention has been described with reference to a preferred embodiment. However, the scope of the invention is not limited to the illustrated embodiment, and alterations and modifications can be carried out without deviating from the scope of the invention.

FIG. 3 shows a cross-sectional view through a first mould part 110 for use in a method of manufacturing a wind turbine blade. The first mould part 110 comprises a first forming surface 112, which define an outer surface of the finished wind turbine blade, here the pressure side of the wind turbine blade. A number of first fibre layers, core parts and reinforcement sections are arranged at the forming surface 112, these parts being included in a finished shell part of the wind turbine blade shell part. The blade shell part comprises one or more lower first fibre layers 152 preferably pre-impregnated with resin and optionally coated with a gelcoat, which define the exterior surface of the shell part, and one or more upper first fibre layers 154 preferably pre-impregnated with resin, and which define the interior surface of the shell part. The upper first fibre layer(s) 154 and lower first fibre layer(s) 152 are separated by a first fibre insertion or first main laminate 170 comprising a plurality of fibre layers advantageously pre-impregnated with resin, a first core part 166 and a second core part 168, as well as a first fibre reinforcement 174 at a trailing edge 164 of the shell part and a second fibre reinforcement 172 at a leading edge 162 of the shell part. In some embodiments the first fibre reinforcement 174 and/or the second fibre reinforcement 172 may be omitted.

As shown in FIG. 4, the main laminate comprises a plurality of fibre layers. The fibre layers comprises a number of inner fibre layers 190, a number of outer fibre layers 194, and a number of intermediate fibre layers 192. According to one advantageous embodiment, the inner fibre layers 190 comprises steel fibres only, whereas the outer layers 194 similar to the previous embodiment comprises chopped or woven fibres of a second type with a diameter substantially smaller than that of the steel wires. The outer layers may be made entirely of glass fibres or carbon fibres. The intermediate layers 192 may be made of hybrid mats comprising both steel wires and fibres of the second type. Thereby, a quantitative ratio between the steel wires and the second fibres gradually changes from a first ratio at the inner fibre layers 190 to a second ratio at the number of outer layers 192. Thereby, a gradual transition in stiffness through the shell construction is obtained, thus preventing the formation of boundary surfaces with stress formations and lowering the risk of delamination of the various fibre layers. By using different hybrid mats having different quantitative ratios between the steel wires and the second type fibres, a particularly smooth transition can be obtained. Such a configuration can of course also be used for the other fibre reinforcements of the shell construction or wind turbine blade.

Afterwards a longitudinally extending reinforcement element 130, such as a reinforcement beam or a reinforcement web, is arranged on top of the different layers at the first forming surface 112 as shown in FIG. 5. The reinforcement beam 130 is in this embodiment formed as a tubular element having two reinforcement legs extending between the pressure side and the suction side of the finished blade. The reinforcement beam 130 comprises a first side and a second side. The reinforcement beam further comprises a first reinforcement section 133 having a first bonding surface 134, which faces towards the outer fibre layer(s) 154, and a second reinforcement section 135 having a second bonding surface 136.

A similar arranging process is carried out in a second mould part 210. FIG. 6 shows a cross-sectional view through the second mould part 210 for use in a method of manufacturing a wind turbine blade. The second mould part 210 comprises a second forming surface 212, which define an outer surface of the finished wind turbine blade, here the suction side of the wind turbine blade. A number of second fibre layers, core parts and reinforcement sections are arranged at the second forming surface 212, these parts being included in a finished shell part of the wind turbine blade shell part. The blade shell part comprises one or more lower second fibre layers 252 preferably pre-impregnated with resin and optionally coated with a gelcoat, which define the exterior surface of the shell part, and one or more upper second fibre layers 254 preferably pre-impregnated with resin, and which define the interior surface of the shell part. The upper second fibre layer(s) 254 and lower second fibre layer(s) 252 are separated by a second fibre insertion or second main laminate 270 comprising a plurality of fibre layers advantageously pre-impregnated with resin, a first core part 266 and a second core part 268, as well as a first fibre reinforcement 274 at a trailing edge 264 of the shell part and a second fibre reinforcement 272 at a leading edge 262 of the shell part. In some embodiments the first fibre reinforcement 274 and/or the second fibre reinforcement 272 may be omitted.

A polymer foil 276 is arranged on top of the outer second fibre layer(s) 254. The polymer foil 276 is adhered to the second mould part by use of a sealant 278, 279, such as tacky tape or a rubber sealant. The polymer foil 276 is utilised to retain the second fibre material, the second main laminate and core parts against the second forming surface 212. Thereby, the second mould part can be lifted and rotated together with these materials and sealed against the first mould part 110 in order to form a closed mould configuration as shown in FIG. 7. The second bonding surface 136 is pressed against the polymer foil 276. The first outer mould part and the second outer mould part are advantageously arranged so that the first fibre material and the second fibre material partially overlap at a boundary surface. Thus, it is ensured that the composite structure does not contain any bonding lines, which may later lead to hairline fractures or the like. Thus, it is not necessary to arrange separate reinforcement sections 172, 272; 174, 274 in the two mould part 110, 210. Instead common reinforcement sections may be utilised.

A first vacuum bag 140 is sealed again the inside of the wind turbine blade, i.e. between the first fibre material, the second fibre material and the first side 131 of the reinforcement beam. Similarly a second vacuum bag 140 is sealed again the inside of the wind turbine blade, i.e. between the first fibre material, the second fibre material and the second side 132 of the reinforcement beam. Further, an additional vacuum bag 144 is sealed within the tubular shaped reinforcement beam 144 in order to ensure that a sufficient evacuation of the mould cavity between the vacuum bags and the mould part can be achieved (in case the reinforcement beam is partially permeable to air). The vacuum bags 140, 142, 144 are open at the root end of the blade, where they will be sealed using a root plate (not shown). The root plate is sealed against the mould part 110, 210 by use of tacky tape or another sealant.

The mould cavity is subsequently evacuated, whereby the vacuum bags are sucked against the mould parts and the reinforcement beam or web, thus comprising the fibre layers against the forming surfaces. Afterwards, the mould is heated to a first temperature, where resin can flow as a liquid and in the process filling the entire mould cavity and thus impregnating all the fibre material. The mould is then heated to a second temperature, at which the resin cures.

The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET. If for instance a thermosetting resin, such as polyester, is used, it is recognised that heating of the mould may not be necessary order to bring the resin to a liquid state. However, according to a particularly advantageous embodiment, the resin comprises an in-situ polymerisable thermoplastic material, such as cyclic poly(1,4-butylene terephthalate) (CBT). The in-situ polymerisable thermoplastic material may be used for pre-impregnating the fibre material, i.e. in a pre-preg. Alternatively, it may be sprayed on in powder form on the fibre material or be arranged in the mould parts as separate layers. CBT has the advantage that they obtain a water-like viscosity when heated to a temperature of approximately 150 degrees Celsius. Thereby, it is possible to quickly impregnate the fibre material of very large composite structures to be moulded and subsequently curing the resin in very short cycle times. Afterwards, the mould is heated to approximately 210 degrees Celsius, at which temperature, the resin polymerises and cures. The polymer foil 276 is made of a material, which will melt and mix into the resin during the impregnation process and create a strong mechanical bonding to the reinforcement element 130.

When the mould has been cooled down to a temperature, at which it can be handled, the wind turbine blade can be demoulded.

The reinforcement element may have various designs, but advantageously, it comprises large bonding surfaces and high shear strength. FIGS. 8 and 9 show two second and third embodiments of such reinforcement elements, respectively, in which like numerals refer to like parts of the first embodiment of the reinforcement element 130 shown in FIGS. 5 and 7. The second embodiment of the reinforcement element 230 is shaped as a tubular element. The reinforcement element comprises first uncured layers 237 of fibre material at the first bonding surface 234, and second uncured layers 238 of fibre material at the second bonding surface 236. The uncured parts ensure a strong mechanical bonding to the shell part of the blade, when the mould is heated and the resin is brought to reflow and subsequently cured. The third embodiment of the reinforcement element 330 is shaped as an I-shaped beam. The reinforcement element 330 comprises first uncured layers 337 of fibre material at the first bonding surface 334, and second uncured layers 338 of fibre material at the second bonding surface 336.

The reinforcement element may be tapered and pre-bent in the longitudinal direction of the wind turbine blade, so that the bonding surfaces follows the contour of the wind turbine blade.

Also, it is conceivable to use the first reinforcement section of the reinforcement element as a main laminate of the shell part and/or the second reinforcement section of the reinforcement element as a main laminate of the shell part. In such a situation, it is not necessary to arrange a separate fibre insertion in the two mould part as shown in FIGS. 3 and 6.

In some situations it may be necessary to supply additional resin to the mould cavity in order to manufacture the wind turbine blade via a VARTM process. In this situation, both a vacuum outlet and a resin inlet need to be coupled to the mould cavity.

FIG. 10 shows a cross-sectional view through an embodiment of a mould for use in a VARTM process. The figure shows an embodiment, in which the wind turbine blade (here depicted a cross section of the circular root section) is manufactured as one, hollow piece instead of as two separate shell parts, which subsequently are glued together. The wind turbine blade is manufactured in a closed mould, which comprises a first mould part 410 and a second mould part 420 arranged to form closed mould. For sake of clarity, the longitudinally extending reinforcement element, the polymer foil and the vacuum bags are not shown in the figure.

The first mould part 410 comprises a first forming surface 412 with a first contour that defines a part of the outer surface of the wind turbine blade, and the second mould part 420 comprises a second forming surface 422 with a second contour that defines another part of the outer surface of the wind turbine blade. A number of fibre layers 452, 454, 456 comprising for instance metallic wires, advantageously steel wires, is arranged in the mould cavity between the outer mould parts 410, 420 and the vacuum bags.

After all material has been arranged in the mould cavity, the closed mould may, as shown in FIG. 11, be rotated approximately 90 degrees about the longitudinal axis in order to supply liquid from resin inlets 480 connected to a source of uncured resin and assuming a low point in the cross-section of the closed mould. Further, a vacuum outlet 482 connected to a vacuum source 496, such as a vacuum pump, may be arranged at the highest point of the cross-section of the closed mould, optionally with an overflow vessel 498 for collecting resin, which has been sucked into the vacuum outlet 482. By regulating the amount of resin supplied from the resin inlets 480 it is possible to control flow fronts of liquid resin 499 in order to maintain a balance between the injected resin and gravity, thus avoiding the formation of air pockets within the wind turbine blade.

The resin inlet 480 and vacuum outlet 482 need not be positioned at the rim of the mould parts as shown in FIGS. 10 and 11. However, it is important that the resin inlet assumes a low point during the impregnation process. The invention is particularly suited for this kind of moulding, since the larger voids between the steel wires ensure that air in the mould cavity is forced forward by flow fronts of liquid resin during the impregnation or injection process. Thus, it is ensured that no air pockets are formed in the composite structure, i.e. the wind turbine blade. When a wind turbine blade is manufactured as two or more separate shell part, which are subsequently assembled, e.g. by gluing the parts together, the separate shell parts are often manufactured via a VARTM process using a first rigid mould part and a vacuum bag. Since the vacuum bag is transparent, it is possible to observe the flow fronts of liquid resin. Thus, it is also possible to observe a possible formation of an air pocket. Thereby, an operator may be able to remedy such formations, for instance by reversing the flow fronts by switching the operation of the vacuum outlet(s) and/or the resin inlet(s). However, in a closed, hollow moulding process, it is not possible to observe the propagation of the liquid resin during the impregnation process. Therefore, the combined use of metallic wires and the low viscosity in-situ polymerisable resin material is particularly suited for this kind of moulding.

The invention has been described with reference to advantageous embodiments. However, the scope of the invention is not limited to the illustrated embodiment, and alterations and modifications can be carried out without deviating from the scope of the invention.

LIST OF REFERENCE NUMERALS 2 wind turbine
4 tower
6 nacelle
8 hub
10 blade
14 blade tip
16 blade root
18 leading edge
20 trailing edge
30 root region
32 transition region
34 airfoil region
110, 210, 410, 420 first/second mould part
112, 212, 412, 422 first/second forming surface
130, 230, 330 reinforcement beam/reinforcement web
131, 231, 331 first side
132, 232, 332 second side
133, 233, 333 first reinforcement section
134, 234, 334 first bonding surface
135, 235, 335 second reinforcement section
136, 236, 336 second bonding surface
237, 337 first uncured part
238, 338 second uncured part
140 first vacuum bag
142 second vacuum bag
144 additional vacuum bag
152, 252, 452 fibre layer
154, 254, 454 fibre layer
456 fibre layer
162, 262 leading edge
164, 264 trailing edge
166, 266 first core part
168, 268 second core part
170, 270 reinforcement section/main laminate/fibre insertion
174, 274 second fibre reinforcement
276 polymer foil
278, 279 sealant/tacky tape
480 resin inlet
482 vacuum outlet
494 source of uncured resin
496 vacuum source
498 overflow vessel
499 flow fronts

The invention claimed is:

1. A method of manufacturing a longitudinally extending composite structure including a shell part comprising a fibre reinforced polymer material including a polymer matrix and fibre material embedded in the polymer material, wherein the shell part is manufactured in a closed mould comprising at least a first outer mould part having a first forming surface and a second outer mould part having a second forming surface, wherein the method comprises the steps of:
  a) arranging a first fibre material on the first forming surface of the first outer mould part,
  b) arranging a pre-fabricated longitudinally extending reinforcement element, selected from a group consisting of a beam or a web, on top of the first fibre material, the reinforcement element having a first side and a second side, and a first bonding surface and a second bonding surface, the reinforcement element being arranged so that the first bonding surface faces towards the first forming surface, wherein the reinforcement element is used to retain the first fibre material against the first outer mould part during layup,
  c) arranging a second fibre material on the second forming surface of the second outer mould part,
  d) sealing a polymer foil above the second fibre material so as to retain the second fibre material against the second forming surface,
  e) closing the at least first outer mould part and the second outer mould part so as to form the closed mould, and so that the second bonding surface of the reinforcement element faces towards the second forming surface,
  f) forming a mould cavity by arranging a first vacuum bag between the first outer mould part, the second outer mould part and the first side of the reinforcement element, and arranging a second vacuum bag between the first outer mould part, the second outer mould part and the second side of the reinforcement element,
  g) evacuating the mould cavity,
  h) providing a resin in the mould cavity simultaneously with and/or subsequently to steps a) and c), and
  i) curing the resin in order to form the composite structure.

2. The method according to claim 1, wherein the composite structure is a wind turbine blade.

3. The method according to claim 2, wherein the reinforcement element comprises a composite material, at least 51% of the composite material being pre-cured.

4. The method according to claim 3, wherein the entire composite material of the reinforcement element is pre-cured.

5. The method according to claim 3, wherein the composite material of the reinforcement element comprises an uncured part at the first bonding surface and/or the second bonding surface.

6. The method according to claim 1, wherein the reinforcement element comprises a first longitudinally extending reinforcement section at the first bonding surface and/or a second longitudinally extending reinforcement section at the second bonding surface.

7. The method according to claim 1, wherein the reinforcement element is formed as a longitudinally extending tubular shaped element.

8. The method according to claim 1, wherein the reinforcement element is formed as a longitudinally extending I-shaped beam.

9. The method according to claim 7, wherein an additional vacuum bag is arranged within the tubular shaped element.

10. The method according to claim 1, wherein the first fibre material and/or the second fibre material comprises a prepreg material.

11. The method according to claim 10, wherein the first fibre material and the second fibre material comprises prepreg material only, and where no further resin is supplied after steps a) and c).

12. The method according to claim 1, wherein the resin comprises an in-situ polymerisable thermoplastic material.

13. The method according to claim 1, wherein the polymer foil is made of a material which melts at temperatures used for curing the resin in step i).

14. The method according to claim 1, wherein an additional polymer foil is arranged on top of the first fibre material between step a) and step b).

* * * * *